(12) United States Patent
Lee et al.

(10) Patent No.: US 11,669,998 B2
(45) Date of Patent: Jun. 6, 2023

(54) METHOD AND SYSTEM FOR LEARNING A NEURAL NETWORK TO DETERMINE A POSE OF A VEHICLE IN AN ENVIRONMENT

(71) Applicant: GM GLOBAL TECHNOLOGY OPERATIONS LLC, Detroit, MI (US)

(72) Inventors: Han UL Lee, Sterling Heights, MI (US); Brent N. Bacchus, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 17/153,874

(22) Filed: Jan. 20, 2021

(65) Prior Publication Data
US 2022/0230353 A1 Jul. 21, 2022

(51) Int. Cl.
*G06T 7/73* (2017.01)
*G06N 3/08* (2023.01)

(52) U.S. Cl.
CPC .............. *G06T 7/74* (2017.01); *G06N 3/08* (2013.01); *G06T 2207/10032* (2013.01); *G06T 2207/20076* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2019/0050648 A1* | 2/2019 | Stojanovic | G06V 20/13 |
| 2020/0160151 A1* | 5/2020 | Urtasun | G06N 3/04 |
| 2020/0364247 A1* | 11/2020 | Van Sickle | G01S 13/865 |
| 2022/0024485 A1* | 1/2022 | Theverapperuma | G06K 9/6257 |

OTHER PUBLICATIONS

Fu et al ("LiDAR-based vehicle localization on the satellite image via a neural network", Robotics and Autonomous Systems, vol. 129, Jul. 2020, pp. 1-11, https://doi.org/10.1016/j.robot.2020.103519, retrieved from the Internet on Sep. 1, 2022) (Year: 2020).*

Kim et al ("Satellite Image-based Localization via Learned Embeddings", 2017 IEEE International Conference on Robotics and Automation (ICRA), pp. 2073-2080, Jul. 24, 2017, DOI: 10.1109/ICRA. 2017.7989239, retrieved from the Internet on Sep. 1, 2022) (Year: 2017).*

* cited by examiner

*Primary Examiner* — Leon Viet Q Nguyen
(74) *Attorney, Agent, or Firm* — Lorenz & Kopf LLP

(57) ABSTRACT

Methods and systems are provided for learning a neural network and to determine a pose of a vehicle in an environment. A first processor performs a first feature extraction on sensor-based image data to provide a first feature map. The first processor also performs a second feature extraction on the aerial image data to provide a second feature map. Both feature maps are correlated to provide a correlation result. The first processor learns a neural network using the correlation result and ground-truth data, wherein each of the first feature extraction and the second feature is learned to extract a portion of features from the respective image data. A geo-tagged second feature map can then be retrieved by an on-board processor of the vehicle which, along with on-board processed sensor-based data by the network trained by the first processor, determines the pose of the vehicle.

18 Claims, 7 Drawing Sheets

METHOD AND SYSTEM FOR LEARNING A NEURAL NETWORK TO DETERMINE A POSE OF A VEHICLE IN AN ENVIRONMENT

The technical field generally relates to pose determination of vehicles navigating through an environment. More particularly, it relates to a method and a system for learning a neural network to determine a position of a vehicle in an environment in order to improve real-time localization of the vehicle.

In the last years, on-board camera-based navigation systems have achieved great importance due to an increasing demand for passenger transportation systems. Such systems provide positioning information for vehicles moving through an environment. The positioning information is used to navigate a corresponding vehicle or is used to provide information about a traffic situation in certain regions. However, data obtained from such sensor-based navigation systems sometimes lack accuracy that may be currently required in order to reliably navigate the vehicle in certain situations. The requirement for accurate positioning information is important for navigation purposes and becomes even more important for navigation scenarios in which the vehicle navigates through densely populated areas, for example large cities, in which multiple different features and objects in the surrounding environment must be distinguished. Additionally, accurate positioning information is also required in environments that have no specific or typical objects based on which a sensor-based positioning might be performed. In order to solve a localization problem, on-board sensor-based systems, including for example camera systems etc., are trained utilizing manually annotated features, i.e., traffic signs and lane edges, so that a matching of an inferred pose of these features and already mapped out features can be done to recover positions. However, the manual annotation of the corresponding features required for this approach increases the preparation effort for such systems.

Accordingly, it is desirable to provide an improved identification of relevant features that avoids such manual feature annotation, distinguish such relevant features from features that provide less reliable information for navigational purposes, and provide a self-learning process for improving said distinction in order to improve determining the pose of a moving object, such as a vehicle. Furthermore, other desirable features and characteristics of the present invention will become apparent from the subsequent detailed description and the appended claims, taken in conjunction with the accompanying drawings and the foregoing technical field and background.

SUMMARY

A computer implemented method for learning a neural network to determine a pose of a vehicle in an environment is provided. The method includes obtaining, by a first processor, sensor data of the environment to provide a sensor-based image. The method further includes performing a first feature extraction by the first processor, wherein features are extracted from the sensor-based image to provide a first feature map. The method further includes obtaining, by the first processor, aerial image data of the environment. The method further includes performing a second feature extraction by the first processor, wherein features are extracted from the obtained aerial image data to provide a second feature map. The method further includes correlating, by the first processor, the first feature map with the second feature map to provide a correlation result. The method further includes obtaining ground-truth data by the first processor. Furthermore, the method includes learning, by the first processor, a neural network using both the correlation result and the ground-truth data, wherein learning the neural network includes learning the first feature extraction to extract a portion of features from the sensor-based image and learning the second feature extraction to extract a portion of features from the obtained aerial image data.

In an exemplary embodiment, the first processor rotates the first feature map before correlating the first feature map with the second feature map.

In an exemplary embodiment, the first processor applies an interpolation, for example a spatial interpolation, a cubic interpolation, a bilinear interpolation or any another interpolation process, on the second feature map before correlating the first feature map with the second feature map.

In an exemplary embodiment, the first processor learns the neural network includes by determining a predicted coordinate in the correlation result using a soft-argmax function, determining a ground-truth coordinate on the correlation result based on the ground-truth data, and determining a loss value based on the predicted coordinate and the ground-truth coordinate.

In an exemplary embodiment, the first processor learns the neural network by determining a ground-truth Gaussian distribution based on the ground-truth data, and determining a loss value based on the ground-truth Gaussian distribution and the correlation result.

In an exemplary embodiment, the first processor backpropagates the loss value to learn the neural network based on which the first processor extracts the portion of features from the sensor-based image.

In an exemplary embodiment, the first processor backpropagates the loss value to learn the neural network based on which the first processor extracts the portion of features from the obtained aerial image data.

In an exemplary embodiment, the first processor reduces the loss value in an iterative process in which the loss value is repeatedly determined and backpropagated to learn the neural network.

In an exemplary embodiment, the first processor determines a prioritized feature group of the extracted portion of features from the sensor-based image and also determines a de-prioritized feature group of the extracted portion of features from the sensor-based image. The prioritized feature group is assigned a higher influence on reducing the loss value than the de-prioritized feature group.

In an exemplary embodiment, the first processor extracts the portion of features from the sensor-based image by extracting only features of the prioritized feature group. Furthermore, the first processor extracts the portion of features from the obtained aerial image data by extracting only features of the prioritized feature group.

In an exemplary embodiment, the first processor learns the neural network until a convergence to a specified accuracy is reached such that a learned neural network is provided.

In an exemplary embodiment, the first processor determines the second feature map, for example a geo-tagged second feature map, after the convergence to the specified accuracy is reached, encodes the second feature map and stores the second feature map on a storage medium.

In an exemplary embodiment, a second processor is provided that determines the pose of the vehicle using the learned neural network. The second processor is an on-board processor of the vehicle.

In an exemplary embodiment, the second processor determines the pose of the vehicle using the learned neural network by retrieving the second feature map from the storage medium, obtaining sensor data of the environment through which the vehicle navigates in order to provide a sensor-based image, extracting features from the sensor-based image to provide a first feature map, processing the first feature map using the learned neural network, correlating the first feature map with the second feature map to provide a correlation result, and determining the pose of the vehicle based on the correlation result.

In an exemplary embodiment, the second processor applies a particle filter to the correlation result determined by the second processor. The particle filter provides a probability distribution within the correlation result, wherein the probability distribution indicates an expected position of the vehicle. The second processor determines the pose of the vehicle based on the probability distribution.

In an exemplary embodiment, the probability distribution is provided within the correlation result by assigning a probability value to each pixel within a part of the correlation result.

In an exemplary embodiment, the second processor determines a position and an orientation of the vehicle based on the probability distribution.

In an exemplary embodiment, the aerial image data is provided by an external entity that is spatially separated from the vehicle.

In an exemplary embodiment, the aerial image data is provided by a satellite system.

A system for determining a position of a vehicle in an environment is provided. The system includes a first processor and a second processor. The first processor obtains sensor data of the environment to provide a sensor-based image and performs a first feature extraction, wherein features are extracted from the sensor-based image to provide a first feature map. The first processor further obtains aerial image data of the environment and performs a second feature extraction, wherein features are extracted from the obtained aerial image data to provide a second feature map. The first processor correlates the first feature map with the second feature map to provide a correlation result. The first processor further obtains ground-truth data. The first processor learns a neural network using both the correlation result and the ground-truth data, wherein learning the neural network includes learning the first feature extraction to extract a portion of features from the sensor-based image and learning the second feature extraction to extract a portion of features from the obtained aerial image data. The second processor is an on-board processor of the vehicle and determines the pose of the vehicle using the neural network learned on the first processor.

BRIEF DESCRIPTION OF THE DRAWINGS

The exemplary embodiments will hereinafter be described in conjunction with the following figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module and/or system refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
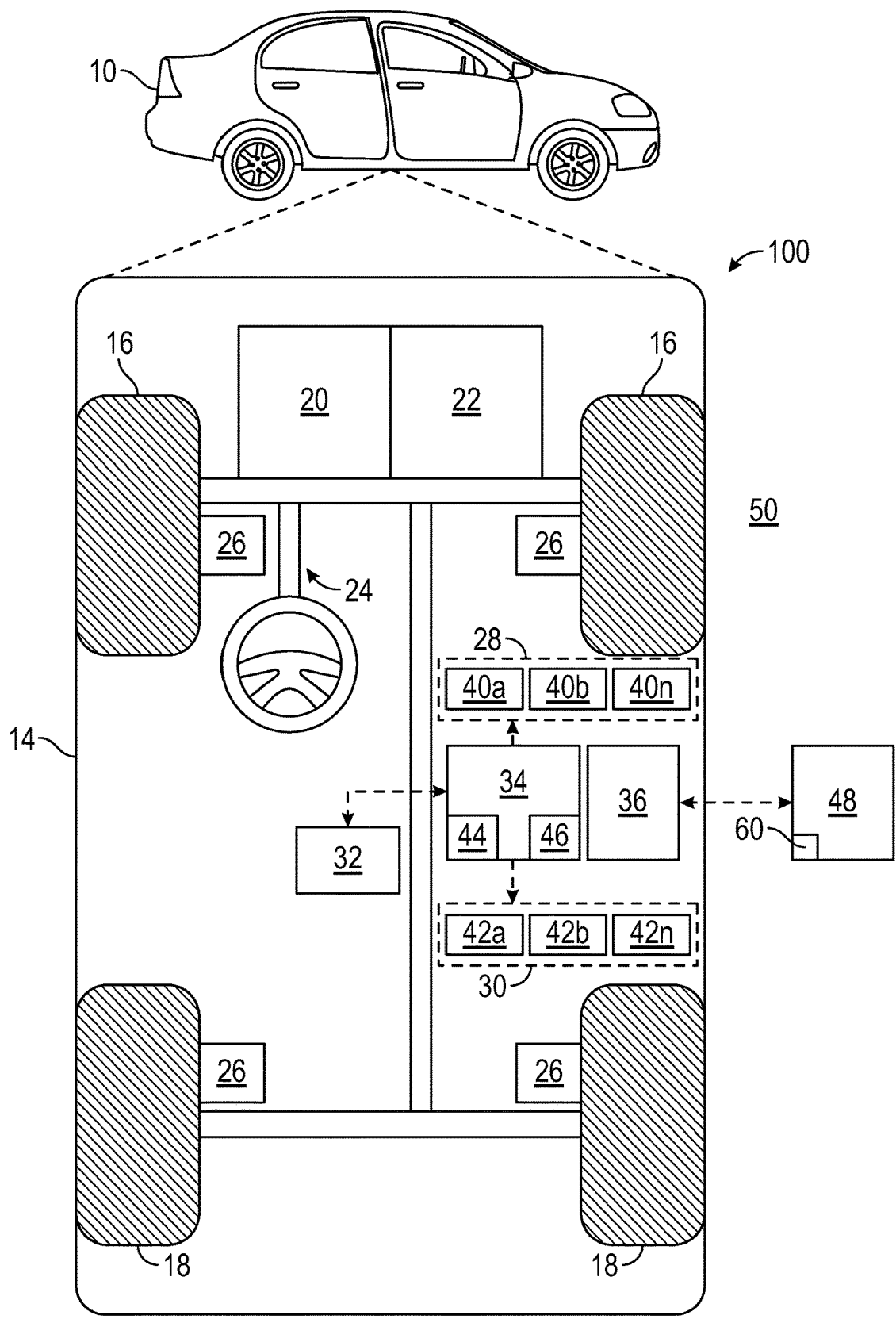
FIG. 1 is a vehicle having a processor executing a method for determining a pose of a vehicle in accordance with an embodiment.

With reference to FIG. 1, a vehicle 10 is shown in accordance with various embodiments. The vehicle 10 generally includes a body 14, front wheels 16, and rear wheels 18. The vehicle 10 generally includes a propulsion system 20, a transmission system 22, a steering system 24, a brake system 26, a sensor system 28, an actuator system 30, at least one data storage device 32, at least one controller 34 and a communication system 36. The propulsion system 20 may, in various embodiments, include an internal combustion engine, an electric machine such as a traction motor, and/or a fuel cell propulsion system.

The sensor system 28 includes one or more sensing devices 40a-40n that sense observable conditions of the exterior environment 50 and/or the interior environment of the vehicle 10 which for instance is an autonomous vehicle 10. One or more of the sensing devices 40a-40n may, for example, sense objects in the exterior environment 50 of the vehicle 10. The sensing devices 40a-40n can include, but are not limited to, radars, lidars, global positioning devices, cameras, in particular optical cameras and/or thermal cameras, ultrasonic sensors, temperature sensors and/or other sensors. For example, a sensing device 40a can include a camera configured for receiving object and/or image data from the environment 50, i.e., the surroundings of the vehicle 10. The image data can include information about at least one object located in the environment 50 of the vehicle 10. The actuator system 30 includes one or more actuator devices 42a-42n that control one or more vehicle features such as, but not limited to, the sensing devices 40a-40n, the propulsion system 20, the transmission system 22, the steering system 24, and the brake system 26.

The communication system 36 is configured to wirelessly communicate information to and from other entities 48, such as but not limited to a first processor 60 which may be part of a back office, a satellite navigation system, other vehicles ("V2V" communication,) infrastructure ("V2I" communication), remote systems, personal devices or combinations thereof.

The first processor 60 may be configured to carry out the methods steps of a method for learning a neural network based on which the pose of the vehicle 10 can be determined. In particular, a geo-tagged second feature map as well as the learned neural network may be provided by the first processor 60 to a second processor 44 of the vehicle, wherein the second processor 44 is an on-board processor of the vehicle. The on-board processor 44 of the vehicle can then determine the pose of the vehicle 10 using the learned neural network and the geo-tagged second feature map. In other words, the first processor 60 of the back office may carry out a learning or training process to learn the neural network and the second processor 44 on board the vehicle 10 may determine the pose of the vehicle using the learned neural network.

In an exemplary embodiment, the communication system 36 is configured to receive information from the first processor 60. Furthermore, the communication system 36 may receive satellite information from other entities 48 such as a satellite system. The communication system 36 may be configured to receive aerial images from aircraft or spacecraft, ground-truth information or camera images and/or data corresponding to such images.

In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the data storage device 32 stores defined or predetermined maps of the navigable environment 50. In particular, the data storage device 32 may provide map data being representative of an environment 50 of the vehicle 10, in particular of the environment through which the vehicle currently navigates. Furthermore, the data storage device 32 may provide images, for example stored camera images or aerial images of the environment 50. The map data may be updated continuously, i.e., in real-time, to provide map and/or image data corresponding to an environment 50 the vehicle 10 is currently driving through. In various embodiments, the defined maps and/or images may be predefined by and obtained from a remote entity 48 such as a remote data server or the first processor 60. In particular, the data storage device 32 stores algorithms to carry out a neural network, for example the learned neural network obtained from the first processor. Furthermore, the data storage device 32 may store a second feature map, e.g., a geo-tagged second feature map, received from the first processor 60. For example, the defined maps and/or images may be collected by the remote system and communicated to the autonomous vehicle 10 (wirelessly and/or in a wired manner) and stored in the data storage device 32. The data storage device 32 may have stored image data of an environment 50 and/or feature data of objects in the environment 50. For example, the stored image data may include appearances of objects and object features allocated to specified locations in the environment 50. Object features as described herein may correspond to trees, vehicles, sidewalks, traffic signs, streets and street crossings, pedestrian crossings, intersections, grass-covered areas near a street, etc. As will be appreciated, the data storage device 32 may be part of the controller 34, separate from the controller 34, or part of a system separate from the vehicle 10.

The controller 34 includes the second processor 44 and a computer readable storage device or media 46. Each of the first processor 60 and the second processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the first processor 60 and/or second processor 44 are powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10, and in particular for determining a pose of the vehicle 10, i.e., a position and an orientation of the vehicle 10 within the environment.

The instructions may include one or more separate programs, each of which comprises an ordered listing of executable instructions for implementing logical functions. The instructions, when executed by the first processor 60 and/or the second processor 44, receive and process signals from the sensor system 28, perform logic, calculations, methods and/or algorithms, in particular machine learning algorithms, for determining the pose of the vehicle 10 within the environment 50, for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, the first processor 60 implements machine learning techniques, such as backpropagating one or more loss values for improving a feature extraction or summarization based on feature maps and images using ground-truth determination, and the like.

In various embodiments, the second processor 44 implements methods and systems for determining the pose, e.g., the position and/or orientation of the vehicle 10 as will be discussed in more detail herein. In particular, the second processor 44 implements a method for determining the pose of the vehicle 10 in the environment 50 using the neural network learned on the first processor 60 as well as geo-tagged aerial image data provided by the first processor 60. The neural network learned on the first processor may be further improved by additional learning techniques provided by the on-board processor 44 of the vehicle 10.

In an exemplary embodiment, the methods and systems include training a deep-learning neural network (DLNN) in an end-to-end fashion on the first processor 60 to directly predict the ground truth pose and include a particle filter applied on the second processor 44 to match learned features and estimate the pose. The described methods and systems enable improved localization in regions which lack mapped semantic and vehicle-sourced features and thus improve the localization accuracy and reduce costs by eliminating the need for annotating semantic features present in the obtained images. The deep-learning neural network carried out by the first processor 60 further learns in an end-to-end fashion to extract optimal features for localization based on a prioritization scheme without requiring any annotation of the features. The prioritization scheme may include distinguishing between prioritized features and de-prioritized features, wherein prioritized features have a more reliable response for localization purposes.

In other words, the method and systems automatically identify non-semantic and semantic features while training a detector without annotated data, avoiding the need for an expensive annotation process. The features are automatically selected and learned during the end-to-end process in order to optimize localization performance while constraining map storage. This includes to learn ignoring or de-prioritizing transient objects in aerial and camera imagery, such as shadows, persons, trees or other vehicles in the environment, etc. Furthermore, the map storage space can be constrained via employing an autoencoder and the data collection can be facilitated via the provision of aerial imagery, camera imagery, and ground truth data from real-time kinematics.

The method and systems enable a first-day driving by using aerial imagery instead of vehicle-sourced data and provide support for ambiguous scenarios where the exact vehicle pose cannot be completely determined, e.g., on straight roads with no lateral information, by providing an uncertainty indicator.

Figure 2:
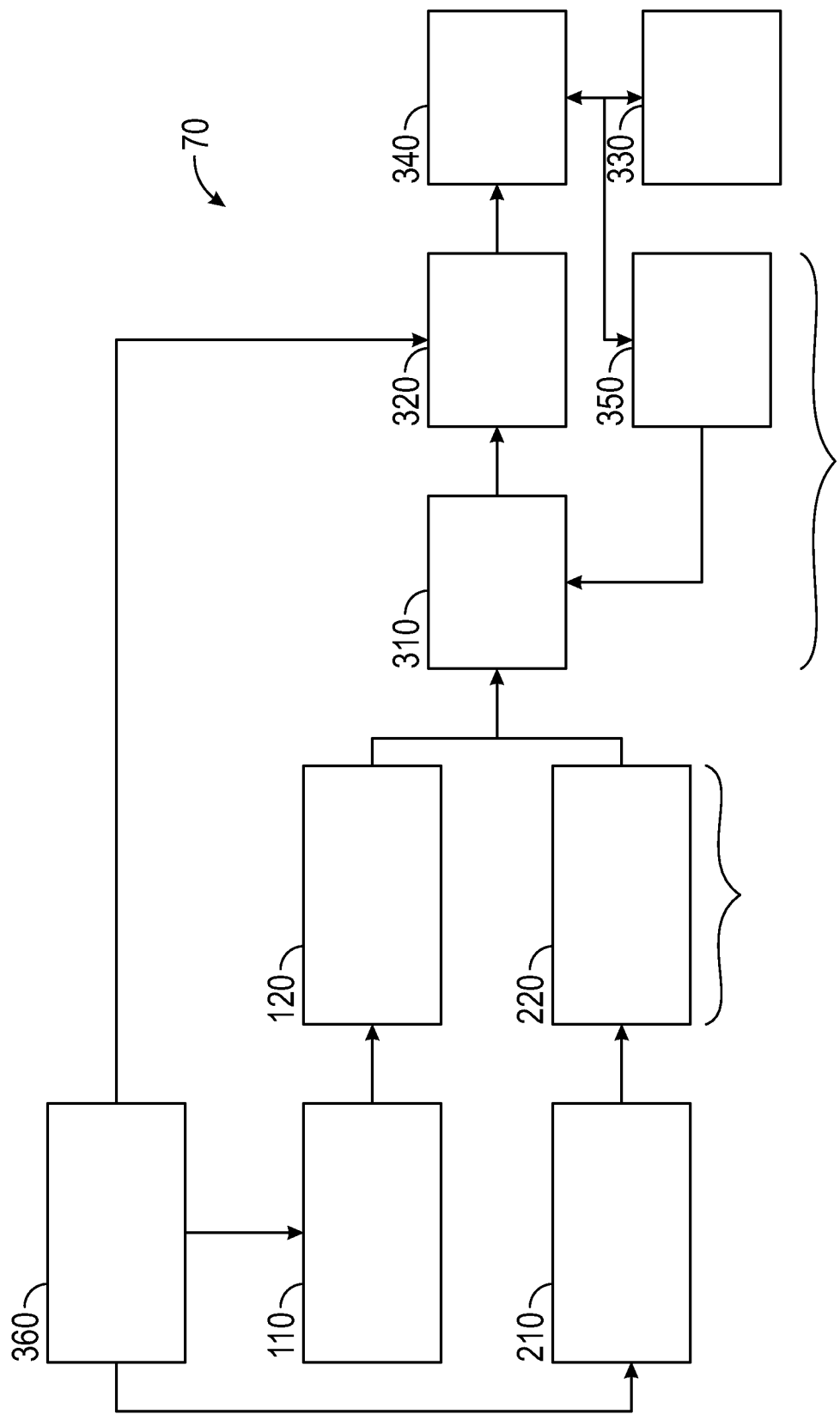
FIG. 2 is an illustration showing a system for determining a pose of a vehicle in accordance with an embodiment.

With reference now to FIG. 2, a system 70 for determining a pose of the vehicle 10 (FIG. 1) in the environment 50 is shown. The vehicle 10 includes a sensor with a camera 40a and/or other sensing devices 40n, for example radar or lidar, that generate sensor data of the environment 50 through which the vehicle 10 navigates. The camera 40a generates a sensor-based image 110, e.g., a camera image 110, that includes objects and/or object features, such as trees, other vehicles, sidewalks, etc. The sensor-based image is then provided to the first feature extractor 120. The first feature extractor 120 carries out a first feature extraction and generates a first feature map based on the sensor-based image 110. The first feature map may include various features of the environment 50 of the vehicle 10. The features in the first feature map can include object features of objects in the environment 50, such as lateral boundaries of a road or an intersection, sidewalks, etc. This first feature map may include less features as compared to the feature amount in the camera image before the feature extraction. Steps of above-described process may be performed on a so-called camera side which will be described in more detail with respect to FIG. 5.

The vehicle 10 (FIG. 1) further receives via the communication system 36 aerial image data of the environment 50 of the vehicle 10. These aerial image data may be provided as or based on an aerial image 210 captured by an external entity 48 that is located separate to the vehicle 10. The external entity 48 may be an aircraft or spacecraft, for example a satellite, that has captured the aerial image 210 of the environment 50. The aerial image 210 may include objects and/or object features, such as trees, other vehicles, sidewalks, etc. The communication system 36 provides the aerial image data to the second feature extractor 220. The second feature extractor 220 carries out a second feature extraction and generates a second feature map based on the aerial image data. The second feature map may include various features of the environment 50 of the vehicle 10. The features in the second feature map can include object features of objects in the environment 50, such as lateral boundaries of a road or an intersection, sidewalks, etc. This second feature map may include less features as compared to the feature amount in the aerial image before the feature extraction. Steps of above-described process may be performed on a so-called aerial image side which will be described in more detail with respect to FIG. 5.

A correlator 310 which correlates the first feature map with the second feature map to provide a correlation result forming a so-called correlation surface. The correlation result may include correlated feature data, for example image feature data of both the first feature map and the second feature map.

In an example, a filter 320 is provided, wherein a filtering process is performed on the correlation result as will be described in further detail with respect to FIG. 6. The output of the filtering process may be fused with other existing localization strategies that deliver additional inputs 360, for example support vector machine (SVM) data, Global Positioning System (GPS) data, yaw data, etc. In this way, a pose distribution 340 for the vehicle 10 in the environment is obtained which can then be further refined based on ground-truth data and a training process that improves feature extraction and selection of the first and second feature maps.

The filtering process may be part of a runtime operation in which the vehicle pose is determined using the learned neural network.

Ground-truth data is provided by real-time kinematics 330 and is used together with the correlation result to determine a loss value indicative of a localization loss. The loss value may be determined based on a deviation between a predicted x-y-coordinate of the vehicle in the correlation result and a ground-truth-$x_{gt}$-$y_{gt}$-coordinate of the vehicle 10 determined from the ground-truth data. The loss value is used to learn the neural network based on which the first feature extraction in the first feature extractor 120 and the second feature extraction in the second feature extractor 220 are improved. In particular, the extractors learn to adjust their neural network weights to extract features which can best reduce the localization loss, i.e., the loss value, wherein the loss value is repeatedly determined and backpropagated to learn the neural network, thereby providing a localization-in-the-loop process 350 in which the loss is iteratively reduced until the training converges to a point where cross-validation performance is satisfactory. In this case, it can be said that the loss value has reached a predetermined or minimum threshold loss value or that a convergence to a specified accuracy threshold is reached. If so, the feature extractors 120, 220 have learnt to recognize noises, such as shadows, persons, trees and/or cars, which makes the respective extraction and summarization features to be non-impact, for example "0", so that such noises in the images do not contribute to the computation of the correlation result.

Figure 3:
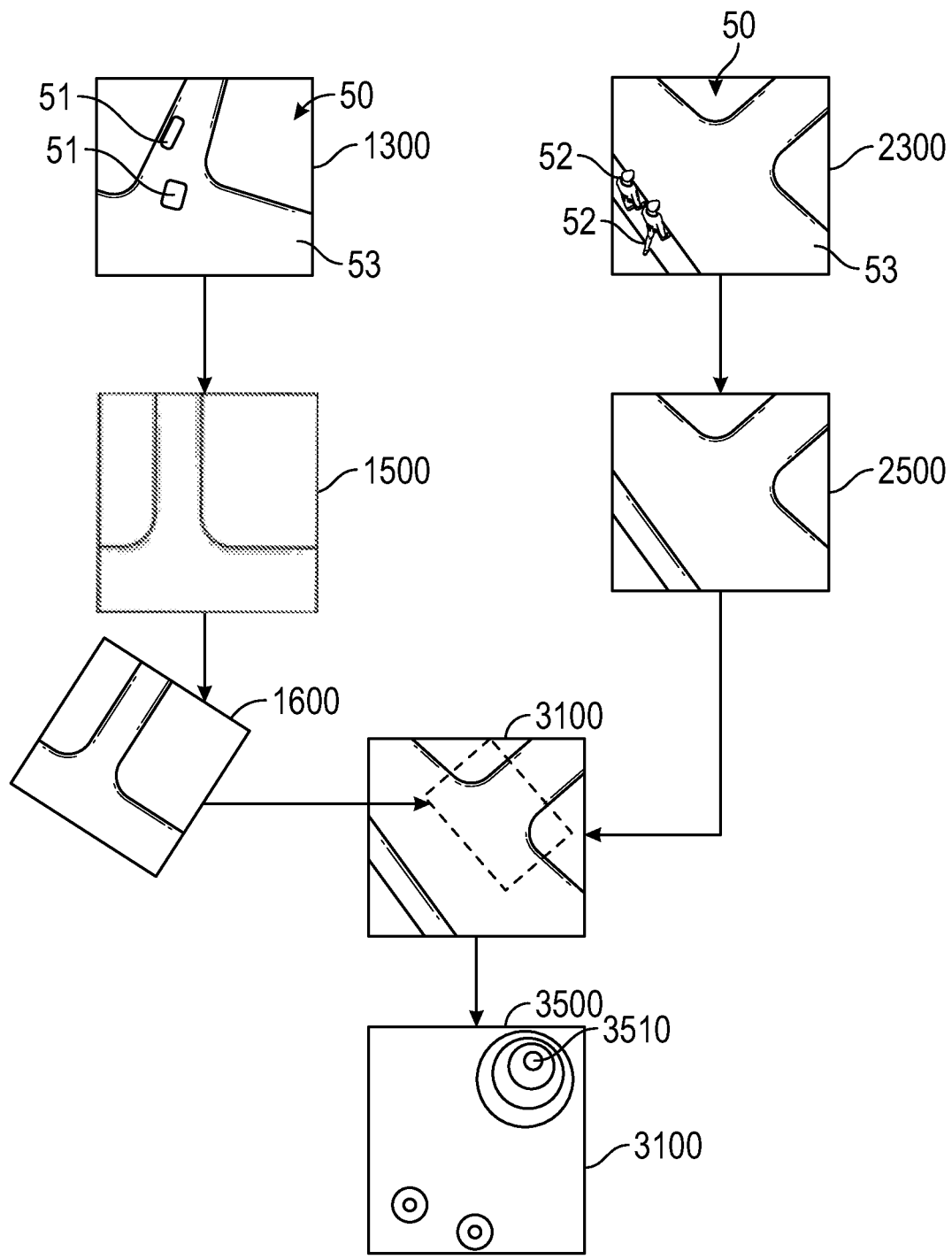
FIG. 3 is a visualized example of a method for learning a neural network to determine a pose of a vehicle in accordance with an embodiment.

FIG. 3 illustrates a detailed example of a method for learning a neural network to determine the pose of a vehicle as described herein, wherein emphasis is given to the learning principle applied in the context of the method in order to improve the accuracy of pose determination. In particular, FIG. 3 shows how the image features in a sensor-based image 1300 and an aerial image 2300 are processed to learn the neural network. In this example, image features may correspond to objects, for example other vehicles 51, trees, persons 52 as well as objects associated to the road 53 in the environment 50 represented within the captured images 1300, 2300. Image 1300 is acquired by on-board sensors of a vehicle (for example a vehicle as described in FIG. 1) and includes an on-board camera view of the surrounding objects 51, 53. The image data is obtained from on-vehicle sensors, e.g., camera, radar, lidar. Image 2300 is acquired by a separate entity providing aerial images of the environment 50 surrounding the vehicle. However, it will be appreciated that aerial images may also be retrieved from a storage medium. The aerial features in the aerial image 2300 may be summarized in a single channel or multi-channel configuration. In order to provide a normalized correlation, i.e., correlation result 3100 of the sensor-based image 1300 and the aerial image 2300, a feature extraction and summarization in which features of the images 1300, 2300 are extracted and selected is performed on the images 1300, 2300. In particular, features in the sensor-based image 1300 are extracted and summarized which results in a first feature map 1500. The extraction and summarization include removing noises like cars and/or shadows from the image 1300. Furthermore, features in the aerial image 2300 are also extracted and summarized which results in a second feature map 2500. The extraction and summarization on both sides include removing noises corresponding to features like cars, trees and/or shadows from the images 1300, 2300. During this extraction step, some features are accentuated leading to a group of features, i.e., features that are considered to be more important, that will be prioritized over another group of features, i.e., features that are considered to be less important. Before correlating the first feature map 1500 with the second feature map 2500, the first feature map 1500 is rotated based on data corresponding to the orientation of the vehicle, i.e., the ego yaw, to provide a rotated first feature map 1600. In the correlation, the rotated first feature map 1600 slides on or overlays the second feature map 2500 to provide a correlation result 3100 which is also referred to herein as correlation surface 3100. Based on the correlation surface 3100 and ground-truth data, a position data map 3500 of the vehicle can be determined. From a highest peak region 3510 in the correlation surface 3100, a predicted position of the vehicle can be inferred, for example having the x-y-coordinates [10,3]. The ground-truth data, however, provides $x_{gt}$-$y_{gt}$-coordinates [10,2] that differ from the predicted x-y-coordinates. Based on this deviation, a loss can be determined that is used to learn the neural network which improves feature extraction and summarization in many iterations and ultimately leads to the true coordinate [10,2]. In particular, the correlation surface 3100 can be turned onto a backwards propagatable loss that is differentiable in two different ways.

The first way is to use a two-dimensional spatial soft-argmax function to produce one x-y-coordinate. A loss, i.e., a mean squared error (MSE), can be determined against the ground-truth pose location on the correlation surface 3100, wherein the ground-truth can be computed based on a global location ground-truth latitude/longitude/orientation obtained from accurate position devices, such as real-time kinematics, to an $x_{gt}$-$y_{gt}$-coordinate on a specific area, such as an intersection as shown in images 1300, 2300. Since the two-dimensional spatial soft-argmax is differentiable, through the backpropagation using stochastic gradient descent, the feature extractions and summarizations learn to adjust their neural network weights to extract features and select features which can best reduce the localization loss. This learning applies to both the aerial image side and the vehicle sensor side and is implemented in the neural network based on which the pose of the vehicle 10 (FIG. 1) is determined during a runtime operation that may be carried out on the on-board processor 44.

For example, if there is a scene with road edges, driveways, sidewalks, and shadows, in the beginning the extracted features may be referring to grass or mailboxes etc., and the selection/summarization module may be selecting grass mostly and possibly some other objects. Since other scenes in the dataset may not have mailboxes or grass, the localization loss will be large for those areas. However, after iterations of training, the neural network learns to extract features that are more robust across all the scenes in the dataset, i.e., perhaps road edges and sidewalks and general road-shapes, since these features are more common and occur more often than mailboxes, and the neural network also learns the typical appearance of shadows and transient objects such as cars, trees, persons and the like. The summarization and selection can be trained to negate certain features which are deemed as noises, i.e., shadows, trees, persons and/or cars, and accentuate features that are more reliable such as road-shapes or sidewalks. After this training converges to a point (convergence point or accuracy) where a cross-validation performance is satisfactory, the neural network is able to recognize noises such as shadows and/or cars, making the respective summarization features to be non-impact, for example "0", so that these features do not contribute to the computation of the correlation surface 3100. In this case, the learning of the neural network has converged to a specified accuracy. In this manner, the neural network learns the first feature extraction to extract a portion of features from the sensor-based image and learns the second feature extraction to extract a portion of features from the obtained aerial image data.

Hence, the neural network automatically trains the network to select important features and learns to automatically select robust features and de-prioritize non-robust features. In this way, a prioritized feature group and a non-prioritized feature group can be established, wherein the prioritized feature group is assigned a higher influence on reducing the loss value than the non-prioritized feature group. The network does not only learn semantic features like traffic signs, lane edges, road edges, etc., but also non-semantic features like road-shapes, sidewalks, structures, little alleys, driveways having untypical shapes, etc., in the form of dense features.

The second way of turning the correlation surface 3100 into a backwards propagatable loss is that the method includes preparing a ground-truth pose into a ground-truth Gaussian distribution surface that has the same size as the inferred correlation surface 3100 computed from correlating the rotated first feature map 1600 with the second feature map 2500 as described above and carrying out a pixel-wise loss of the inferred correlation surface 3100 against the ground-truth Gaussian distribution surface. This second approach has the effect of guiding the neural network to learn more focused features. Instead of well-spread out road shapes, this approach enables the neural network to focus on specific parts of road shapes.

Figure 4:
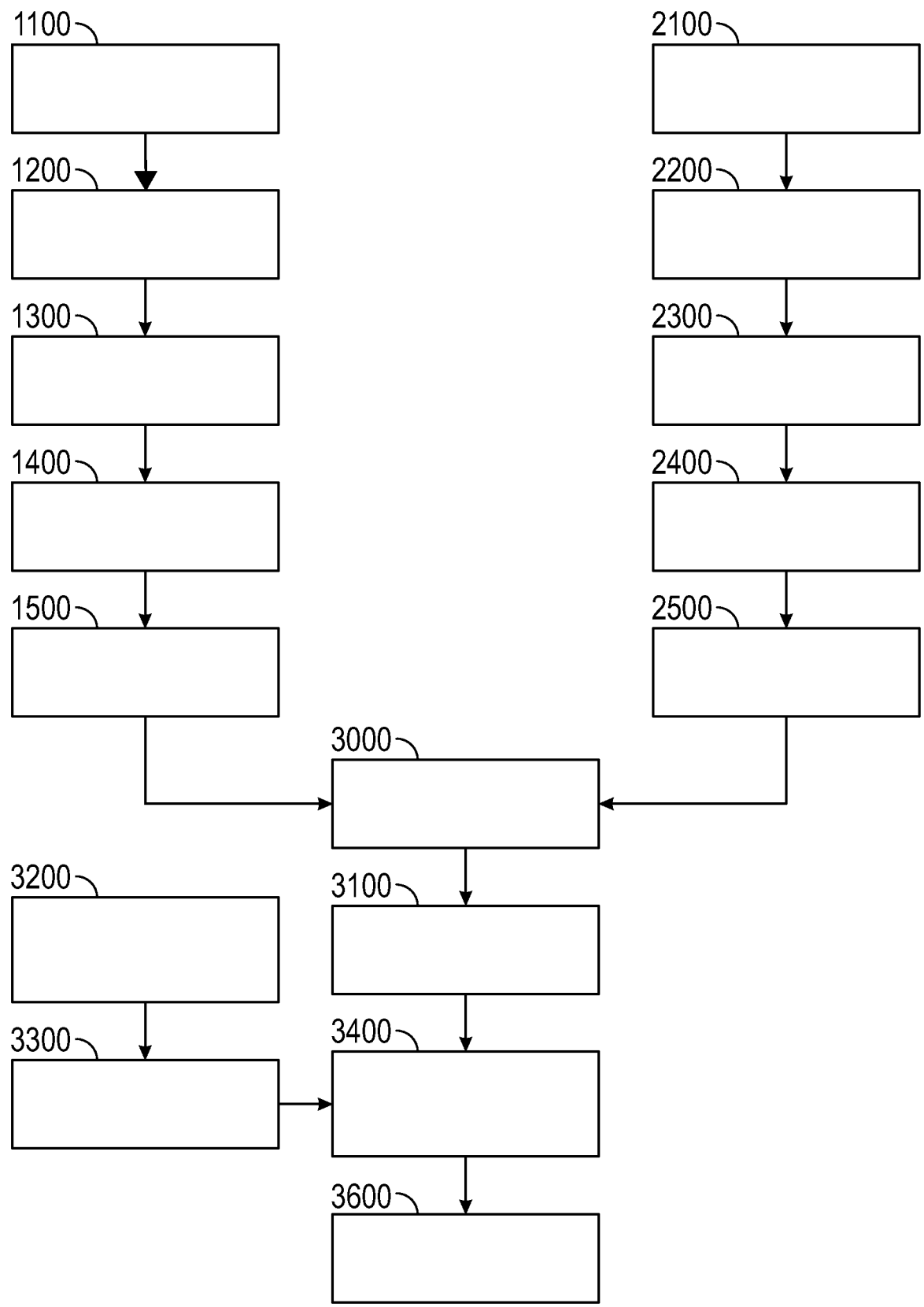
FIG. 4 illustrates a schematic diagram of a software architecture of a system for learning a neural network to determine a pose of a vehicle in accordance with an embodiment.

FIG. 4 illustrates a schematic diagram of the software architecture of a system for learning a neural network as shown in FIG. 3. The learning process may be carried out on the first processor 60 (FIG. 1). In particular, the first processor 60 includes different processing modules as will be described in the following with emphasis on the learning principle applied to the method for learning the neural network.

In an exemplary embodiment, sensor data 1100 of the environment 50 through which a vehicle navigates is obtained from one or more sensors of the vehicle and is provided to a first image acquisition module 1200 that generates the sensor-based image 1300. The sensor-based image 1300 is provided to a first feature extraction module 1400. The first feature extraction module 1400 extracts a portion of features from the sensor-based image 1300 to provide a first feature map 1500.

In an exemplary embodiment, aerial image data 2100 of the environment is obtained and provided to a second image acquisition module 2200 that generates an aerial image 2300 based on the aerial image data 2100. The aerial image 2300 is provided to a second feature extraction module 2400. The second feature extraction 2400 module extracts a portion of features from the aerial image 2300 to provide a second feature map 2500.

In an exemplary embodiment, a correlation module 3000 correlates the first feature map 1500 with the second feature map 2500 to provide a correlation result 3100.

In an exemplary embodiment, a ground-truth determination module 3200 determines ground-truth data 3300 which is then provided to the loss determination module 3400. A loss value 3600 is determined by the loss determination module 3400 as described with respect to FIG. 3 above. The neural network is learned using the loss value 3600, wherein learning the neural network includes learning the first feature extraction module 1400 to extract a portion of features from the sensor-based image 1300 and learning the second feature extraction module 2400 to extract a portion of features from the obtained aerial image 2300.

Figure 5:
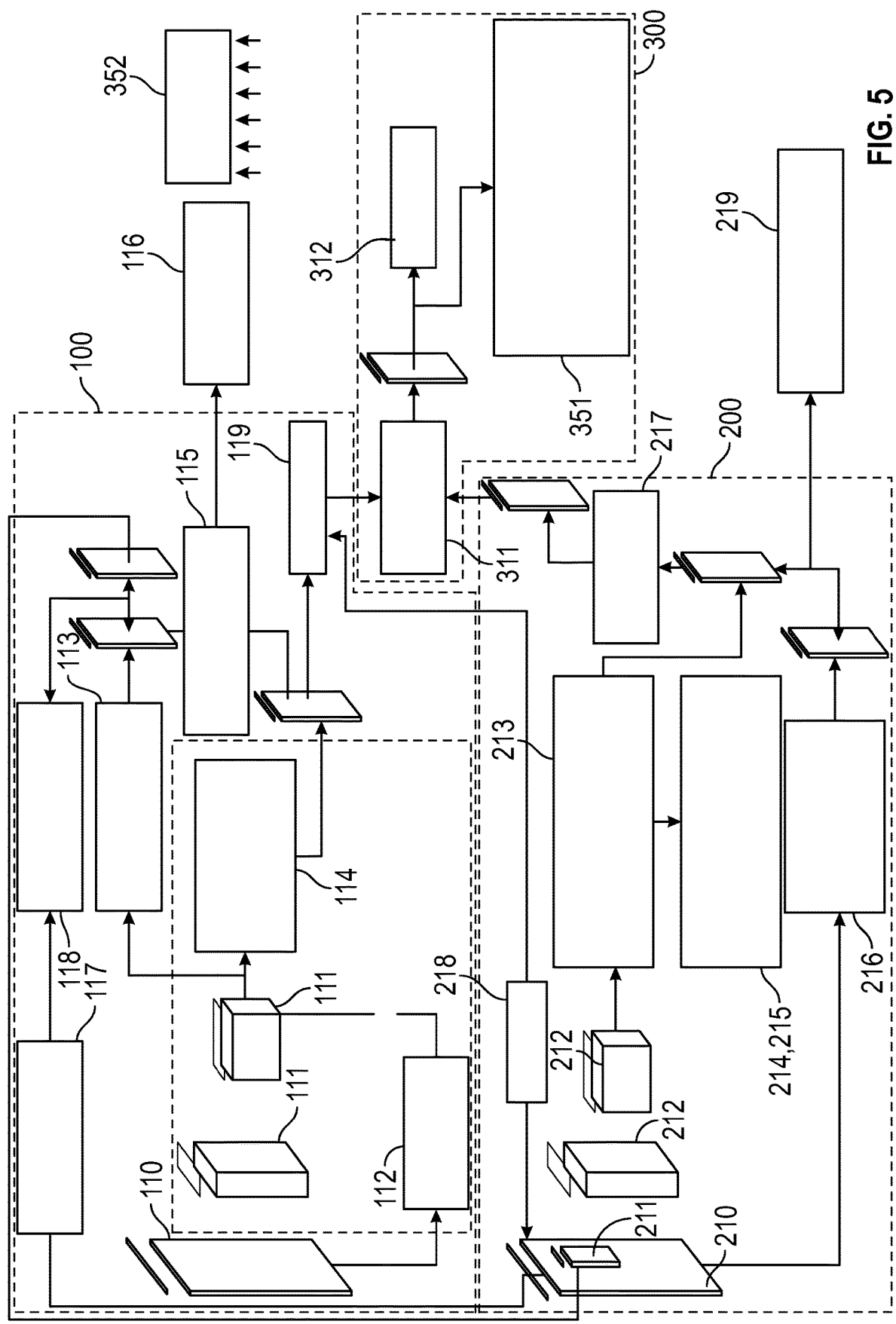
FIG. 5 is a block diagram showing a detailed example of the method steps of a method for learning a neural network to determine a pose of a vehicle in accordance with an embodiment.

FIG. 5 is a block diagram of an exemplary method for learning a neural network to determine a pose of a vehicle, e.g., an electric battery vehicle (BEV). The method of FIG. 5 may be carried out by the first processor 60 shown in FIG. 1 The method includes a camera side 100, an aerial side 200 and a correlation section 300, the interaction of which will be described with reference to the learning process in more detail below.

In an exemplary embodiment, the camera side 100 of the method includes capturing an image 110 of the environment of the vehicle using a camera and/or other sensing devices. This camera image 110 is used as input to the camera side 100 and, in this exemplary embodiment, has three channels, e.g., for red, green and blue. The camera image is provided to the first processor 60 and/or to the second processor 44 and particularly goes through a convolutional feature extraction 111 in the convolutional feature extractor of the BEV, and is optionally concatenated 112 with a homography transformed RGB (red, green, blue) image as a feature. The extracted features from the convolutional feature extraction 111 are aligned 113 with the BEV by being trained against a ground-truth three-channel RGB aerial patch 211 of the aerial image 210 received from the aerial side 200. Shallow convolutional layers in a BEV feature summarization module reduce 114 the D channel features into a single channel feature which is pre-trained 115 against a grayscale version of the BEV prior to being fine-tuned 116 in later steps, wherein a BEV inference alignment loss L2 is provided. A shadow remedy module detects 117 pixels where shadows likely reside in the image based on statistical anomaly detection on the aerial ground-truth patch 211, and masks out 118 the corresponding pixels, wherein a BEV alignment pixel-wise loss L1 is provided. The result of the camera side 100 is the first feature map that is provided to a rotation module that rotates 119 the first feature map before it is provided to the correlation section 300. The rotation 119 may enable an alignment of the image feature perspective of the camera image features to the image feature perspective of the aerial image features. Therefore, the rotation 119 may take into account the orientation of the vehicle, e.g., the ego yaw, that is obtained 218 based on the aerial image 210 on the aerial image side 200. As can be seen from FIG. 5, the BEV module includes the convolutional feature extractor and the summarization module.

In an embodiment, the aerial side 200 of the method includes capturing an aerial image 210 of the environment of the vehicle, wherein the aerial image 210 is provided by an external entity (not shown in FIG. 5) that is located separately from the vehicle. For example, the aerial image 210 may be provided from an aircraft or a satellite, but may also be stored on a storage medium. In this example, the aerial image 210 has three channels, e.g., for red, green and blue. The first processor 60 then carries out the steps of the aerial side 200 as described herein. The aerial image 210 goes through a convolutional feature extraction 212 in the aerial convolutional feature extractor and the resulting features are passed 213 through another set of shallow convolutional layers in the aerial feature summarization module. In an example, the resulting features are further passed 214 to an autoencoder if storage use needs to be reduced. The result of the aerial side 200 is the second feature map that is output as a single-channel summarized feature-map. This summarized feature-map gets pre-trained 216 against a grayscale and bilinearly interpolated version of the original three-channel RGB aerial image 210, wherein an aerial feature pre-train loss L4 is provided. If the autoencoder is employed, which is optional, the extracted features constitute an n-depth feature-map, wherein the total size of the n-depth feature-map is smaller than the single-feature summarized feature-map. Otherwise, the single-channel summarized feature-map gets stored 215 on the vehicle. In addition, a bilinear interpolation is performed 217 on the single-channel summarized feature-map, i.e., the second feature map, before correlating the first feature map with the second feature map in the correlation section 300.

The first feature map, i.e., the single-channel summarized feature-map from the camera side 100, and the second feature map, i.e., the single-channel summarized feature-map from the aerial side 200, are correlated 311 in the correlation module of the correlation section 300 to form a correlation surface that is also referred to herein as correlation result. In an example, both feature maps can be normalized between the values "−1" and "1" before the correlation 311.

In an exemplary embodiment, learning the neural network is accompanied 312 by determining a predicted coordinate in the correlation result using a two-dimensional spatial soft-argmax function and determining a ground-truth coordinate based on the ground-truth data. A loss value for the localization pose loss L3 is determined 351 based on the predicted coordinate and the ground-truth coordinate, in particular based on a deviation between these coordinates in the correlation result. L3 may be referred to as the ground-truth localization loss. Since the two-dimensional spatial soft-argmax function is differentiable, through a backpropagation using stochastic gradient descent, the feature extraction modules (for both camera side 100 and aerial side 200) and the summarization modules (for both camera side 100 and aerial side 200) can learn to adjust 252 their neural network weights in order enable an extraction and a selection of features that can best reduce the localization loss, i.e., the total loss value that takes into account the weighted losses L1, L2, L3 and L4. Further loss values (not shown in FIG. 5) may be provided. For example, an additional loss can be provided that helps to find a better convergence point for feature the extraction neural network, namely an aerial-feature-backwards loss. It comprises, during the training of the feature extractor neural networks, a matching loss with respect to inferred bird-eye view features from the vehicle camera side 100, so that the aerial feature extractor does not only learn from the correlation result and the ground-truth pose, but also from what is seen on the on-vehicle sensors. In this way, such additional loss helps the extractors learning to converge to a better solution, i.e., converge until a specified accuracy is reached.

Alternatively, determining the loss value for the localization pose loss L3 may be accompanied 312 by determining a ground-truth Gaussian distribution based on the ground-truth data. The loss value L3 is determined 351 based on the ground-truth Gaussian distribution and the correlation result.

This means that the total loss value indicative of the localization loss can be used to learn the neural network of the camera side 100 and the aerial side 200 based on which the convolutional feature extraction modules and the summarization modules extract and select features.

Figure 6:
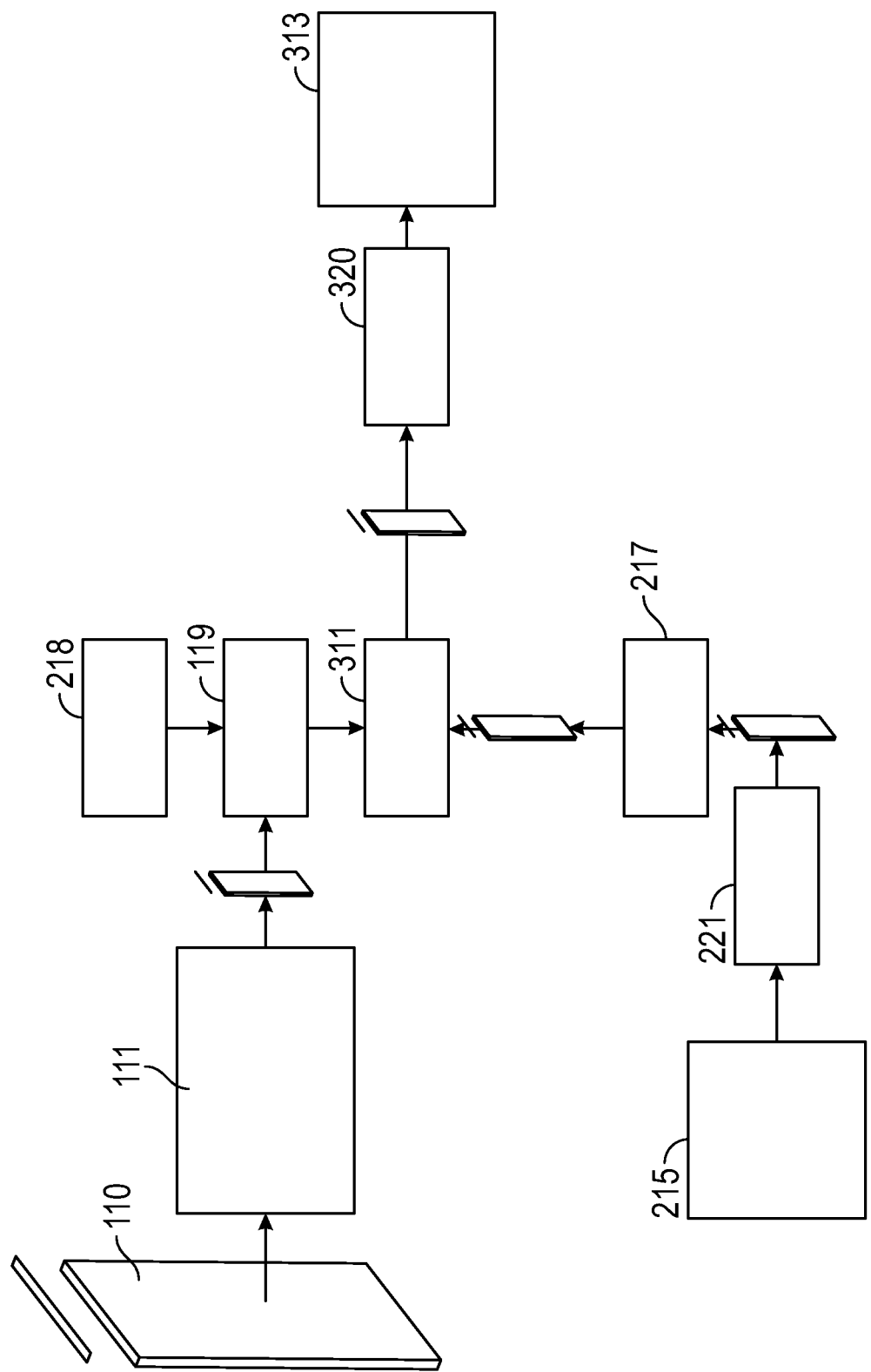
FIG. 6 is a block diagram showing a detailed example of the method steps of a method for determining a pose of a vehicle in accordance with an embodiment.

FIG. 6 is a block diagram showing a detailed example of the method steps of a method for determining a pose of a vehicle using a filtering process in accordance with an embodiment. Emphasis is given to the runtime operation of pose determination of the vehicle 10 (FIG. 1). With regard to the learning steps executed on the camera side 100 and the aerial side 200, reference is made to FIG. 5. During operation, map features on the aerial side 200 can be retrieved 215 from a data storage, for example data storage device 32 of vehicle 10. These map features can be decoded 221 and interpolated 217 to produce a two-dimensional feature matrix that is used as the second feature map. The camera images 110 are also passed through the feature extractor and an extraction 111 is applied thereto to create a BEV two-dimensional feature matrix that is used as the first feature map after rotation 119 based on the vehicle yaw estimated in step 218. Both feature maps are correlated 311 as described herein and the correlation surface is passed 320 into a particle filter which uses the correlation surface as an observation model. The state variables of the particle filter are represented by the x-y-coordinates and the yaw angle, respectively, providing the position and orientation of the vehicle 10 in the environment.

In an exemplary embodiment, the filtering process may include a number of initial particles, e.g., 500 particles, being randomly spread around the GPS location of the vehicle 10. Each particle is assigned a weight that reflects a magnitude or intensity at each pixel location on the correlation surface. Through iterations, in which each iteration will perturb each particle by a random amount, the particles with higher weight survive probabilistically more than the particles with lower weights. The particles converge to swarm around the highest peak region on the correlation surface and the distribution of particles around the region can be computed 313 to a pose distribution, i.e., a mean x-y-coordinate and an orientation as well as a covariance for each. This pose distribution can be solely used as the final output localization or pose determination for the autonomous vehicle 10. Furthermore, this pose distribution can optionally be fused with other existing localization strategies as described with reference to FIG. 2 above. By the use of particle filters, ambiguous scenarios such as long straight roads without longitudinal cues can be used to provide a useful pose distribution that can provide lateral control of the vehicle 10, which enables continuation of autonomous vehicle operation even in the absence of longitudinal cues.

Figure 7:
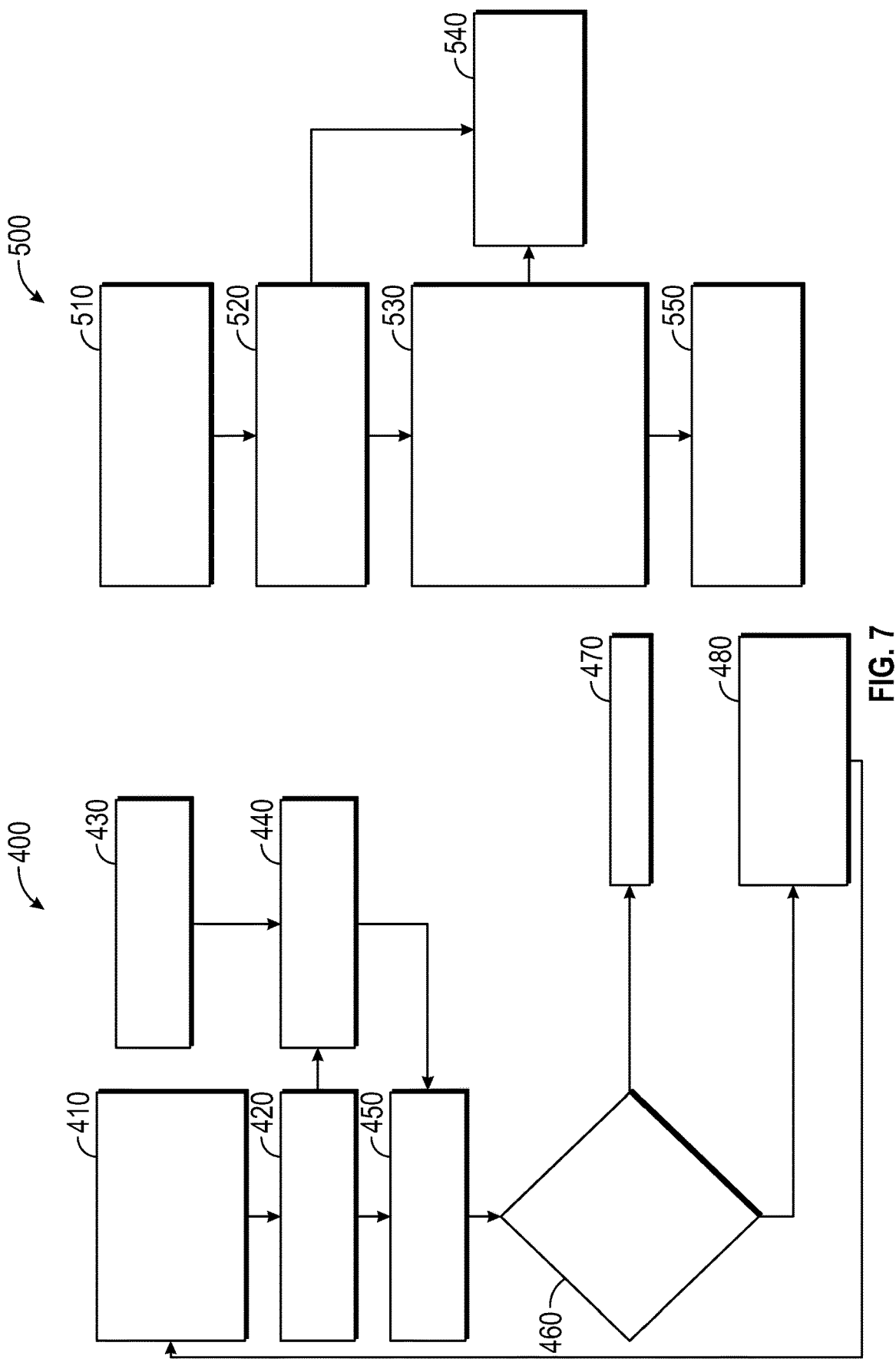
FIG. 7 shows two block diagrams respectively showing a learning process and a runtime operation of the method for determining a pose of a vehicle in accordance with an embodiment.

FIG. 7 shows two block diagrams illustrating a training process 400 for learning the neural network and a runtime operation 500 of the method for determining a pose of a vehicle in accordance with an embodiment. The left diagram of FIG. 7 shows the training process and the right diagram of FIG. 7 shows the runtime operation of the method. It is noted that the steps discussed in the following may be performed by the processors 44 and 60 shown in FIG. 1. In particular, the training process 400 is performed on the first processor 60 separate from vehicle 10, for example a remote-processor of a back office, while the runtime operation 500 may be performed by the second processor 44, for example an on-board processor of the vehicle 10.

The left diagram of FIG. 7 showing the training process 400 includes the step 410 of obtaining sensor-based image data, for example from cameras, and pose information of vehicles via data collection or crowdsourcing. In step 420, this camera-based image data is provided to a convolutional feature extractor and filtered based on existing techniques having existing or initial accuracies. In order to improve these extraction and filter accuracies, the training process applies a neural network, i.e., machine learning techniques, which is learned based on a loss determined after the correlation as described with respect to FIGS. 3 and 5. In particular, step 440 uses a bias correction and preprocessing that is based on the loss determined in the correlation of the feature maps from the camera image obtained in step 410 and the aerial image obtained in step 430. This bias correction improves, i.e., trains the cross-validation in step 450, for example by learning the feature extraction and summarization modalities used to prepare the first and second feature maps being correlated. In step 460, it is determined whether the cross-validation has achieved a desired accuracy. This determination may be made with respect to a specific requirement of the pose determination of the vehicle. If it is determined that the cross-validation has achieved a desired accuracy and meets the requirement, such that the existing or initial accuracies can be improved, the corresponding features that may be prioritized based on an assigned weight are stored as aerial features in step 470. For example, weights indicating a prioritization of the respective features may be stored. However, if it is determined that the cross-validation has not achieved the desired accuracy and does therefore not meet the requirement, resulting in that the existing or initial accuracies cannot be improved, a flag will be generated at least for certain areas in step 480 indicating that the loss has to be further reduced, possibly by initiating a further iteration starting at step 410.

The right diagram of FIG. 7 showing the runtime operation 500 of the method for determining the position of the vehicle includes the step 510 of loading and retrieving the stored weights established in the training process 400. This may include loading the stored weighs when a region having the stored abstract features nears, i.e., the vehicle approaches a region in which the stored abstract features are detected to be present. In step 520, the process includes obtaining a summarized feature map by forward-passing camera feeds from the vehicle cameras. In step 530, the position and orientation of the vehicle 10, i.e., the vehicle pose, is determined and an uncertainty is computed using the particle filter. The uncertainty computation may be carried out previously to triggering the abstract localization of the vehicle 10. In step 540, the map features can be updated during the runtime operation 400 and the uncertainty value, i.e., the delta, is sent to a back office, for example the first processor 60. In step, 550, the resulting estimated localization or pose can then be used directly to determine the position and orientation of the vehicle, or it can be fused with an existing localization strategy, for example SVM, etc. In summary, the method and systems as described herein avoid a manual annotation of features of any kind, but instead rely on an obtained ground-truth pose of the vehicle and its time-synced on-vehicle sensor data, i.e., camera images. With geo-tagged aerial images, the feature extracting neural network is learned in an offline process 400 performed the first processor 60, and then the extracted features are used during the on-vehicle runtime operation 500 in which camera side features are processed on-board the vehicle, in particular by the second processor 44, from raw camera feeds. The aerial feature side is already processed by the first processor 60.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer implemented method for learning a neural network to determine a pose of a vehicle in an environment, comprising:
   obtaining, by a first processor, sensor data of the environment to provide a sensor-based image;
   performing a first feature extraction by the first processor, wherein features are extracted from the sensor-based image to provide a first feature map;
   obtaining, by the first processor, aerial image data of the environment;
   performing a second feature extraction by the first processor, wherein features are extracted from the obtained aerial image data to provide a second feature map;
   correlating, by the first processor, the first feature map with the second feature map to provide a correlation result;
   obtaining, by the first processor, ground-truth data; and
   learning, by the first processor, a neural network using both the correlation result and the ground-truth data, wherein learning the neural network includes learning the first feature extraction to extract a portion of features from the sensor-based image and learning the second feature extraction to extract a portion of features from the obtained aerial image data,
   wherein learning the neural network includes:
   determining a predicted coordinate in the correlation result using a soft-argmax function;
   determining a ground-truth coordinate based on the ground-truth data; and
   determining a loss value based on the predicted coordinate and the ground-truth coordinate.

2. The method of claim 1, further comprising:
   rotating, by the first processor, the first feature map before correlating the first feature map with the second feature map.

3. The method of claim 1, further comprising:
   applying, by the first processor, an interpolation on the second feature map before correlating the first feature map with the second feature map.

4. The method of claim 1, wherein learning the neural network includes:
   determining a ground-truth Gaussian distribution based on the ground-truth data; and wherein the determining the loss value is based on the ground-truth Gaussian distribution.

5. The method of claim 1, further comprising:
   backpropagating, by the first processor, the loss value to learn the neural network based on which the first processor extracts the portion of features from the sensor-based image.

6. The method of claim 1, further comprising:
   backpropagating, by the first processor, the loss value to learn the neural network based on which the first processor extracts the portion of features from the obtained aerial image data.

7. The method of claim 5, further comprising:
   reducing, by the first processor, the loss value in an iterative process in which the loss value is repeatedly determined and backpropagated to learn the neural network.

8. The method of claim 7, further comprising:
   determining, by the first processor, a prioritized feature group of the extracted portion of features from the sensor-based image; and determining, by the first processor, a de-prioritized feature group of the extracted portion of features from the sensor-based image;
wherein the prioritized feature group is assigned a higher influence on reducing the loss value than the de-prioritized feature group.

9. The method of claim 8, further comprising:
wherein extracting, by the first processor, the portion of features from the sensor-based image includes extracting only features of the prioritized feature group; and
wherein extracting, by the first processor, the portion of features from the obtained aerial image data includes extracting only features of the prioritized feature group.

10. A computer implemented method for learning a neural network to determine a pose of a vehicle in an environment, comprising:
obtaining, by a first processor, sensor data of the environment to provide a sensor-based image;
performing a first feature extraction by the first processor, wherein features are extracted from the sensor-based image to provide a first feature map;
obtaining, by the first processor, aerial image data of the environment;
performing a second feature extraction by the first processor, wherein features are extracted from the obtained aerial image data to provide a second feature map;
correlating, by the first processor, the first feature map with the second feature map to provide a correlation result;
obtaining, by the first processor, ground-truth data; and
learning, by the first processor, a neural network using both the correlation result and the ground-truth data, wherein learning the neural network includes learning the first feature extraction to extract a portion of features from the sensor-based image and learning the second feature extraction to extract a portion of features from the obtained aerial image data,
learning, by the first processor, the neural network until a convergence to a specified accuracy is reached such that a learned neural network is provide;
determining, by the first processor, the second feature map after the convergence to the specified accuracy is reached; and
encoding, by the first processor, the second feature map and storing the second feature map on a storage medium.

11. The method of claim 10, further comprising:
determining, by a second processor, the pose of the vehicle using the learned neural network, wherein the second processor is an on-board processor of the vehicle.

12. The method of claim 11, further comprising:
wherein determining, by the second processor, the pose of the vehicle using the learned neural network includes:
retrieving, by the second processor, the second feature map from the storage medium;
obtaining, by the second processor, sensor data of the environment through which the vehicle navigates in order to provide a sensor-based image;
extracting, by the second processor, features from the sensor-based image to provide a first feature map;
processing, by the second processor, the first feature map using the learned neural network;
correlating, by the second processor, the first feature map with the second feature map to provide a correlation result;
determining, by the second processor, the pose of the vehicle based on the correlation result.

13. The method of claim 12, further comprising:
applying, by the second processor, a particle filter to the correlation result determined by the second processor, wherein the particle filter provides a probability distribution within the correlation result, the probability distribution indicating an expected position of the vehicle; and
determining, by the second processor, the pose of the vehicle based on the probability distribution.

14. The method of claim 13, further comprising:
wherein providing the probability distribution within the correlation result includes assigning a probability value to each pixel within at least a part of the correlation result.

15. The method of claim 13, further comprising:
determining, by the second processor, a position and an orientation of the vehicle based on the probability distribution.

16. The method of claim 1,
wherein the aerial image data is provided by at least one external entity that is spatially separated from the vehicle.

17. The method of claim 1,
wherein the aerial image data is provided by at least one satellite system.

18. A system for determining a position of a vehicle in an environment, comprising:
a first processor configured to:
obtain sensor data of the environment to provide a sensor-based image;
perform a first feature extraction, wherein features are extracted from the sensor-based image to provide a first feature map;
obtain aerial image data of the environment;
perform a second feature extraction, wherein features are extracted from the obtained aerial image data to provide a second feature map;
correlate the first feature map with the second feature map to provide a correlation result;
obtain ground-truth data;
learn a neural network using both the correlation result and the ground-truth data, wherein learning the neural network includes learning the first feature extraction to extract a portion of features from the sensor-based image and learning the second feature extraction to extract a portion of features from the obtained aerial image data; and
a second processor on board the vehicle configured to determine the pose of the vehicle using the learned neural network,
wherein learning the neural network includes:
determining a predicted coordinate in the correlation result using a soft-argmax function;
determining a ground-truth coordinate based on the ground-truth data; and
determining a loss value based on the predicted coordinate and the ground-truth coordinate.

* * * * *